Patented Sept. 26, 1950

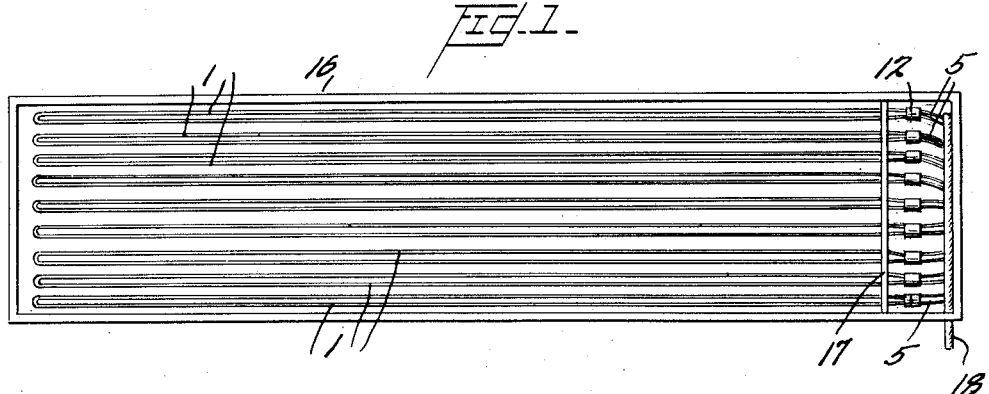
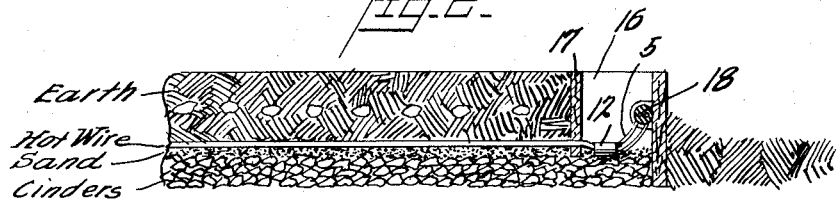
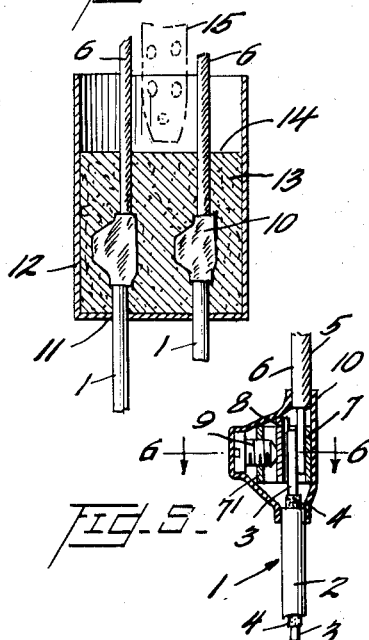
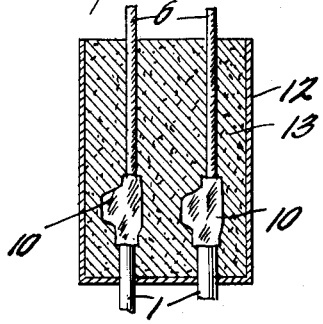
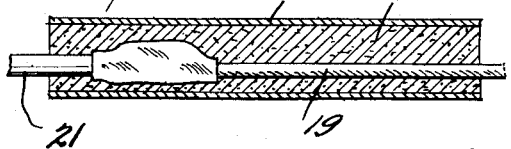
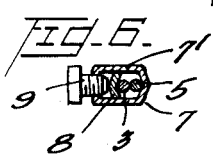

2,523,405

UNITED STATES PATENT OFFICE 2,523,405

ELECTRICAL CONNECTION FOR A HEATING CABLE AND THE METHOD OF MAKING THE SAME

Mardis O. Whithed, Absecon, N. J.

Application April 16, 1948, Serial No. 21,334

1 Claim. (Cl. 201—63)

My invention relates to new and useful improvements in an electrical connection and method of making the same, and has for an object to provide an efficient connection between copper lead-in wires and heat cables.

Another object of the invention is to provide an electrical connection and method of making the same that is particularly adapted for a heating cable that is to be used with a hot bed, so as to keep the earth at an even temperature, and at a higher temperature than would ordinarily be the case if the cables were not used.

Heretofore, one of the difficulties in the use of heating cables in hot beds was that after a relatively short length of time, say a year or two, the connection between the heating cable and the copper lead-in wires deteriorated and formed a short, so that the current, instead of going through the cables, would short into the ground. Thus, not only was the advantage of the heat from the cables lost, but the cost of current was greatly increased. This made it necessary to take out the cables and connections and install new ones at no little cost.

Another one of the objects, therefore, of the present invention is to provide a connection between the lead sheathed chromium heating wires, with the copper inlet wires, so that the connection will last indefinitely; and making it unnecessary even after a long period of years to renew the same.

Still another object of the invention is to provide an electrical connection that will not only be exceedingly mechanically strong, but will also be so well insulated that there is no possibility of a short, or loss of current, at the connection point.

Still another object of the invention is to provide a method of forming this joint so that the work and time consumed is reduced to a minimum, thus cutting down on the cost of installation at the time of putting in the hot bed, or any other usage to which these heating cables may be put.

With these and other objects in view, the invention consists in certain new and novel arrangements and combination of parts and method of forming the joint, as will be hereinafter more fully described and pointed out in the claim.

Referring now more particularly to the drawings, showing a preferred form, and one modification, Fig. 1 is a top plan view of a hot bed, with the cables in place, and before the dirt is placed over them, Fig. 2 is a sectional view of Fig. 1, but showing the hot bed filled with dirt, Fig. 3 is an enlarged, sectional view, showing the connection before the final step, Fig. 4 is a similar sectional view, but showing the joint completed, Fig. 5 is an enlarged, fragmentary, sectional view, showing the first step in the method, Fig. 6 is a sectional view taken on line 6—6 of Fig. 5, and Fig. 7 is a sectional view, showing a slightly modified form.

Referring now, for the moment, to Fig. 5, there is shown what is known as a heating wire or cable 1, which is provided with an outer lead sheath 2 and a chrome heating wire 3, which has an insulating covering 4. The cables generally used for hot beds of this type are known as No. 19 Micro-Chrome heating wire; although, of course, other types of heating cables might be used.

There is also shown the insulated lead-in wire 5 which is generally of copper and may be provided with any form of desired insulation 6.

Now, referring to Figs. 5 and 6, there is shown the mechanical connection or clamp 7, which comprises the relatively small metal casing 7' with its small clamping plate 8 therein and the set screw 9.

After the ends of the heating cable 1 and the lead-in wires are stripped, as shown in Fig. 6, these ends are inserted in the casing 7', and the set screw 9 screwed down tightly on the plate 8 to mechanically clamp the two ends of the cables 1 and 5 together, as shown in Fig. 6.

I have found that the special form of clamp 7 used in this connection is very important as but little of the heating wire 1 extends into the clamp 7; and there are no soldered parts which might melt from the heat of the cable. Furthermore, this form of connection is mechanically strong.

It will be noticed that the lead sheathing 2 is spaced from the clamp 7 so that no current can pass from the clamp 7 to the lead sheathing 2. After this connection is made, the joint is wrapped with electrician's tape 10, as may be seen in the several figures.

It is to be mentioned here that before this physical connection is made, the heating cable 1 is to be passed through an opening 11 in the bottom of a metal container 12; and it will also be understood that as the cable is to be looped, there will be two heating cables or bights and two lead-in wires, but a description of one is a description of both. The heating cable will first extend up past the upper end of the can so that the clamp 7 may be applied and the cable 1; and, of course, its lead-in wire 5 will then be pulled down to the position shown in Fig. 3.

As heretofore mentioned, these cables are generally looped, so that in this container 12 there will be the two free ends of the cable.

As also heretofore mentioned, after the joint is made, as so far described, these cable ends 1 will have been pulled down so that they do not extend over a half inch into the container 12; as otherwise there is a possibility of the insulating material, about to be described, heating; so that in no instance should this heating cable 1 extend over a half inch into the container 12.

The next step is to heat a ladle of sealing-wax 13 and fill the container 12 to the level 14, or about three-fourths full, and then let this harden. After it is hardened and cooled, there is a possibility that there will be air bubbles or voids within the sealing-wax 13, so to overcome this, the end of a blow torch 15 (shown in dotted lines in Fig. 3) is directed momentarily against the surface of the sealing-wax 13 to re-heat it and, making sure, of course, that it does not ignite. After this is re-heated, the sealing-wax 13 will become more compact and thus fill in any voids or bubbles that might have formed in the wax.

The next step is to entirely fill the container 12 with the hot sealing-wax 13, as shown in Fig. 4. This last step is important, as otherwise there is a possibility of leakage of the current at the connection. Of course, different-diameter containers might be used, but I have found that one that is one to two inches in diameter is very successful.

Referring briefly now to one application of the cables in this form of connection, there is shown in Fig. 1 the outline of a hot bed 16 with the cables 1 laid on a layer of sand, which in turn is laid on a base of cinders. Over the cables will be seen the earth in which the seeds, or plants, are to be planted. There may also be seen the dividing board 17 through which the cables 1 pass, and there may be seen the containers 12, in which the aforementioned electrical joint has been made. There may also be seen the lead-in wires 5 leading from a main cable 18.

These heating cables are generally one hundred twenty feet in length, and, of course, when looped sixty feet in length, generally two hundred twenty volts is used to heat the cables. If a smaller bed is used, sixty foot cables can be used, and in that instance, one hundred ten volts is generally applied to these cables.

After the cables are laid, of course, the earth is placed over them, but I do not place any earth over the containers 12, in which the electrical joint has been made.

Referring now to the modification, as shown in Fig. 7, it will be understood that in this instance the connection is just the same, but I cut off the head of the set screw 9 after the same is fastened in position, and, rather than putting two cables in the container, I simply place one, that is, the cable 19. I may use a tube 20 formed of brass, which is less in diameter than the container 12 but generally greater in length.

The heating wire 21 is connected with the cable 19 and should only extend a short way into this tube 20, so that there is no danger of heating the sealing-wax 22 to the melting point.

An installation of this kind might be used on a concrete sidewalk, or other concrete structure, where it is desired to heat the same, as the concrete will not corrode the brass tube.

It will be understood that the clamp used to physically connect the heating wire and the cable is identical with the one in the preferred form; and the method carried out is the same, with the exception that I cut off the head of the set screw and just put one cable in the tube rather than two.

It will also be understood that in the preferred form, there might be just the one cable connection rather than the two as shown; but inasmuch as the containers are much greater in diameter than the one in the modified form, it is generally expedient to enclose the two connections.

As heretofore mentioned, I have found that it is necessary that the physical connection, that is, the clamp 7 be as small in area as possible, so that it will not tend to heat; and it is also necessary that the end of the heating cable, that extends into this, should be as short as possible so as to conduct as little heat as possible to the clamp.

From the foregoing, it will be seen that I have provided an electrical connection for a heating wire, that is mechanically strong and so surrounded by a dielectric that there is no possibility of leakage of the current, or shorting, even after years of use.

It will also be found that I have provided a method of forming a connection that consists of but a few steps, and wherein the time necessary for making the joint is reduced to a minimum.

Many slight changes might be made without departing from the spirit and scope of the invention.

Having thus described my invention, what I claim is new and desire to secure by Letters Patent is:

The method of forming an electrical connection between a lead sheathed chromium heating cable and an insulated copper wire, which consists in stripping the ends of both of said wires and slightly overlapping the two stripped ends, fitting the ends within a relatively small clamp and clamping the two ends under a relatively heavy pressure within said clamp, wrapping the joint with an insulating tape, inserting the clamped wires within a metal container whose internal diameter is several times the external diameter of the lead sheathed cable, the joint positioned near the one end in the container, and filling the container with a hot sealing compound and allowing the sealing compound to cool and harden about the joint within the container.

MARDIS O. WHITHED.

REFERENCES CITED

The following references are of record in the file of this patent:

UNITED STATES PATENTS

| Number | Name | Date |
|---|---|---|
| 429,104 | Witthaus | May 27, 1890 |
| 515,822 | Dewees | Mar. 6, 1894 |
| 612,146 | Thomas | Oct. 11, 1898 |
| 1,500,477 | Warncke | July 8, 1924 |
| 1,517,770 | Ziegler | Dec. 2, 1924 |
| 1,528,091 | Tyrell | Mar. 3, 1925 |
| 1,688,640 | Levin | Oct. 23, 1928 |
| 2,110,457 | Wentz | Mar. 8, 1938 |
| 2,161,447 | Bishop | June 6, 1939 |
| 2,210,750 | Cook | Aug. 6, 1940 |
| 2,282,004 | Scott | May 5, 1942 |

FOREIGN PATENTS

| Number | Country | Date |
|---|---|---|
| 305,298 | Great Britain | Feb. 7, 1929 |
| 502,815 | Great Britain | Mar. 24, 1939 |

OTHER REFERENCES

Sanderson, Electric System Handbook, 1930, pages 496–497.